United States Patent [19]
Kofoed et al.

[11] Patent Number: 6,024,990
[45] Date of Patent: *Feb. 15, 2000

[54] METHOD OF PRODUCING FOOD FLAVORING AGENT

[75] Inventors: Lene Venke Kofoed, Uggerløse; Morten Fischer, Copenhagen V.; Per Munk Nielson, Hillerød; Klaus Pømmer, Farum, all of Denmark

[73] Assignee: Novo Nordisk A/S, Bagsvaerd, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,392

[22] Filed: Oct. 20, 1997

[30] Foreign Application Priority Data

Oct. 30, 1996 [DK] Denmark ................................ 1209/96
Jul. 2, 1997 [DK] Denmark ................................ 0783/97

[51] Int. Cl.$^7$ ...................................... A23G 1/02
[52] U.S. Cl. ................................ 426/44; 426/18; 426/46; 426/49; 426/52; 426/656
[58] Field of Search ................................ 426/44, 46, 18, 426/32, 48, 49, 50, 52, 656

[56] References Cited

U.S. PATENT DOCUMENTS

| | | |
|---|---|---|
| 3,689,277 | 9/1972 | Sfat et al. . |
| 5,100,679 | 3/1992 | Delrue . |
| 5,130,149 | 7/1992 | Keller et al. . |
| 5,141,757 | 8/1992 | Ho Dac et al. . |
| 5,773,055 | 6/1998 | Lee et al. ................................ 426/44 |

FOREIGN PATENT DOCUMENTS

| | | |
|---|---|---|
| 4116744 | 11/1992 | Germany . |
| 94/25580 | 11/1994 | WIPO . |
| 96/13988 | 5/1996 | WIPO . |

OTHER PUBLICATIONS

Baek et al., 97(02):J0182 FSTA, abstracting 1996 IFT annual meeting: book of abstracts, p. 120.

K. Pommer, "New Proteolytic Enzymes for the Production of Savory Ingredients", 1995 American Association of Cereal Chemists, Inc., Oct. 1995, Vo. 40, No. 10., pp. 745–748.

Glesni MacLeod et al., "Soy Flavor And Its Improvement", CRC Critical Reviews in Food Science and Nutrition, vol. 27, Issue 4, (1988), pp. 219–399.

*Primary Examiner*—Leslie Wong
*Attorney, Agent, or Firm*—Steve T. Zelson, Esq.; Reza Green, Esq.

[57] ABSTRACT

The present invention relates to the production of a food flavoring agent. More particularly the invention provides a process for producing a food flavoring agent, which method contains the steps of preparing an aqueous slurry of plant protein and insoluble plant material, treating the slurry with a protease to hydrolyse the protein, maturation, wherein no separation of insoluble material is done between the first two steps. By this method the flavor of a plant protein hydrolysate can be intensified and improved.

28 Claims, No Drawings

1

METHOD OF PRODUCING FOOD FLAVORING AGENT

CROSS-REFERENCE TO RELATED APPLICATIONS

This application claims priority under 35 U.S.C. 119 of Danish application 1209/96 filed Oct. 30, 1996 and Danish application 0783/97 filed Jul. 2, 1997, the contents of which are fully incorporated herein by reference.

TECHNICAL FIELD

This invention relates to the production of a food flavoring agent in a process that involves treating plant protein with a protease to hydrolyze at least 25% of the peptide bonds, i.e. a degree of hydrolysis (DH) above 25%.

BACKGROUND ART

Plant protein hydrolysates are commonly used as food flavoring agents. Thus, WO 94/25580 and K. Pommer, Cereal Foods World, 745 (1995) describe the hydrolysis of plant protein with a fungal protease preparation containing five or more proteolytic enzyme components, to produce a flavoring agent with a high degree of hydrolysis.

The prior art has suggested various ways of modifying or improving the flavor of plant protein hydrolysates. Thus, U.S. Pat. No. 3,689,277 (to Bio-Technical Resources) and JP-A 52-41274 (Kikkoman) describe processes for modifying the flavor of a protein hydrolyzate by adding a sugar (mono- or disaccharide) and heating. The prior art has also suggested the use of carbon treatment or flash treatment to improve the flavor of protein hydrolysates (MacLeod, G., Critical reviews in Food Science and Nutrition, 27, 4, 219–400).

U.S. Pat. No. 5,130,149 discloses the manufacture of coffee flavoring substances by a process comprising enzymatic hydrolysis of soya meal with a protease, followed by heating to 140–200° C. for 0.5–5 hours.

U.S. Pat. No. 5,141,757 discloses the production of a flavoring agent by a process comprising treating a protein material with a protease, heating to 90–140° C. for 10 seconds –30 minutes (the shortest time corresponding to the highest temperature and vice versa), cooling and treating with enzymes from koji.

The prior art also describes the treatment of plant material with proteases for various other purposes not related to food flavoring agents, such as proteinaceous products for use as functional protein or nutritional products where a low degree of hydrolysis (DH) is desired, e.g. U.S. Pat. No. 5,100,679.

It is the object of this invention to provide an improved method of modifying the flavor of a food flavoring agent made by the hydrolysis of plant protein material with proteases without the need for adding sugar and without the need for using excessive temperatures.

STATEMENT OF THE INVENTION

Surprisingly, we have found that the flavor of a plant protein hydrolysate can be intensified and improved by a final maturation at moderate temperature at a fairly low dry matter concentration in the presence of insoluble plant material, in particular insoluble plant cell wall material, remaining after the protein hydrolysis. Thus, the need for a carbon treatment or flash treatment can be avoided.

The inventors presently believe that this flavor development is partly caused by Maillard reactions between the hydrolyzed protein and carbohydrate present in the hydrolyzate, particularly monosaccharides. The inventors also believe that the insoluble sediment after hydrolysis may function as a natural adsorbent for bitter peptides and hydrophobic off-flavor. In previously described processes, this sediment has generally been separated and discarded.

Accordingly, the invention provides a process for producing a food flavoring agent, comprising the steps of:

(a) preparing an aqueous slurry comprising 1–40% by weight of plant protein and insoluble plant material, (b) treating the slurry with a protease to hydrolyze the protein to a degree of hydrolysis above 25%, (c) maturation at 80–140° C., wherein no separation of insoluble material is done between step a) and step c).

DETAILED DESCRIPTION OF THE INVENTION

Plant Protein and Insoluble Plant Material

Plant protein and insoluble plant material from two separate sources can be used, or a plant material containing both of these can be used.

The insoluble plant material may include plant cell wall carbohydrates such as cellulose, hemicellulose or pectic substances, as well as lignified plant material including lignin. The hemicellulose may include xylan, arabinoxylan, xyloglucan, mannan and β(beta)-1,3- and/or β(beta)-1,4-glucan. The pectic substance may include homogalacturonan, rhamnogalacturonan and xylogalacturonan, and it may include side chains such as arabinan, galactan and arabinogalactan.

The plant material may be derived from seeds of a legume, a grain or a vegetable, e.g. soy beans, lupine, alfalfa, peas, faba bean, cotton seed, sesame seed, rape seed, maize (corn), wheat, oats, barley, rye, buckwheat, tomato or carrot. It may comprise whole soy beans, defatted soy beans, lupine seeds, rape seeds, whole wheat, wheat gluten, whole maize, maize gluten. Also, various plant by-products with a high content of cell-wall material can be used, such as potato pulp, tomato peel, sugar beet pulp, wood pulp, bran hulls, corn fiber or corn cobs.

Preparation of Slurry

Before preparing the slurry, the plant material may optionally be given a mechanical pre-treatment to reduce the particle size, e.g. grinding, or wet milling. Thus, the plant material may be used in the form of flakes, whole beans, whole grain, flour or meal.

Optionally, the plant material may be pre-treated by heating either in dry form or after preparing a slurry, e.g. by jet-cooking at 80–125° C. for 20 minutes–2 hours.

Protease

Any protease or mixture of proteases that can give a degree of hydrolysis above 25% can be used. The protease or mixture of proteases can be selected according to principles well known in the art and may include both endo- and exo-peptidases (carboxy-peptidase and/or amino-peptidase).

The protease may be of animal, plant or microbial origin. An example of an animal protease is trypsin, e.g. bovine or porcine trypsin. Microbial proteases may be fungal or bacterial and may be derived from strains of the following genera and species: Bacillus, *B. licheniformis*, *B. subtilis* and *B. amylolique-faciens*, Aspergillus, *A. oryzae*. The bacterial protease may be a subtilisin, e.g. subtilisin Carlsberg, available under the trade name Alcalase®.

To achieve a high degree of hydrolysis, it may be preferable to use a mixture of proteases. One example is Flavourzyme™, a protease preparation derived from *A. oryzae* containing five or more proteolytic components, described in WO 94/25580. Also, a fungal protease preparation (such as Flavourzyme) may be used together with a bacterial protease (such as Alcalase).

Enzymatic Treatment

The treatment with protease may be carried out at conditions chosen to suit the selected enzymes according to principles well known in the art. Typical conditions will be in the ranges pH 4–9, 30–60° C. for 1–24 hours in a slurry containing 1–40% dry matter by weight (preferably 2–20%). Slow stirring may be used during the reaction.

The enzymatic treatment is conducted so as to hydrolyze at least 25% of the total peptide bonds in the protein (both dissolved protein and protein in the sediment), i.e. a degree of hydrolysis (DH) of at least 25% for the protein. It may be preferred to achieve a fairly high DH in order to develop the flavor, or it may be preferred to keep the DH value lower for better process economy. Thus, the DH will typically be in the range 30–90%, particularly 35–80%. The protease dosage will usually include an exo-protease in an amount of 5–100 LAPU/g protein, particularly 10–50 LAPU/g protein and an endo-protease in an amount of 0.1–5 AU/g protein. (LAPU and AU are units of protease activity, defined below). The protein hydrolysis and the measurement of DH may be done as described in J. Adler-Nissen, J. Agric. Food Chem., 27 (6), 1256–1262 (1979); J. Adler-Nissen, "Enzymic Hydrolysis of Food Proteins", Elsevier, London and New York (1986), ISBN 0-85334-386-1; K. Pommer, Cereal Foods World, 745 (1995).

Protease Assay Methods (LAPU and AU)

1 Leucine Amino Peptidase Unit (LAPU) is the amount of enzyme which decomposes 1 $\mu$(micro)M substrate per minute at the following conditions: 26 mM of L-leucine-p-nitroanilide as substrate, 0.1 M Tris buffer (pH 8.0), 40° C., 10 minutes reaction time.

The Anson Unit (AU) is defined in Journal of General Physiology, 22, 79–89 (1959).

Optional Enzymes

Optionally, the hydrolysis step may (in addition to the protease) include one or more other enzymes which can hydrolyze other components of the plant material. Advantageously, the incorporation of such a second enzyme can contribute to the flavor development.

As examples, plant material containing triglycerides (fat or oil) may be treated with a lipase together with the protease; or plant material containing a carbohydrate may be treated with a suitable carbohydrase together with the protease. The carbohydrate may a polysaccharide present in the insoluble plant cell wall material, e.g. cellulose, hemicellulose or pectin, or it may be a soluble or insoluble storage polysaccharide such as starch, insulin or galactomannan, or an oligosaccharide such as stachyose, raffinose, melibiose or sucrose.

The carbohydrase should be selected so as to act on the carbohydrate present in the plant material. The carbohydrase is an enzyme classified in EC 3.2.1.-(glycosidases hydrolyzing O-glycosyl compounds) according to Enzyme Nomenclature. Some examples of carbohydrases are: starch degrading enzymes such as $\alpha$(alpha)-amylase, $\beta$(beta)-amylase, glucoamylase; hemi-cellulases such as arabinanase, arabinofuranosidase, xylanase, 1,3- or 1,4-$\beta$(beta)-xylosidase, $\beta$(beta)- 1,4-galactanase, $\alpha$(alpha)-galacto-sidase, $\beta$(beta)-galactosidase, mannanase; cellulases such as cellobiohydrolase, endo-glucanase; pectinases such as rhamnogalacturonase, rhamnopyranohydrolase, polygalacturonase, glucuronisidase); and other enzymes that hydrolyze plant carbohydrates such as $\beta$(beta)-glucanase and $\beta$-glucosidase.

The carbohydrase may be a purified, mono-component enzyme, or it may be a mixture of several different enzymes. Some examples of specific carbohydrases follow:

$\beta$(beta)-1,4-galactanase from *Aspergillus aculeatus* (S. Christgau et al., Curr. Genet., 1995, vol. 27, 135–141), an enzyme that liberates galactose (a hexose) and galactooligomers.

Viscozyme™ (product of Novo Nordisk A/S), a multi-enzyme complex derived from a strain of Aspergillus sp., containing a wide range of carbohydrases, including cellulase, $\beta$(beta)-glucanase and various types of hemi-cellulase such as arabinanase and xylanase. It also has activity against the branched pectic-like substances found in soy bean cell walls.

Mono-component carbohydrases derived from a strain of *Aspergillus aculeatus* according to L. V. Kofod et al., Carbohydrate Bioengineering, vol. 10, 1995, pp. 321–342: Xylanases (denoted Xyl I, Xyl II and Xyl III), rhamno-galacturonase, rhamnogalacturonan acetyl esterase, galactanase, arabinanase and $\alpha$(alpha)-arabinofuranosidase.

Ultraflo™ (product of Novo Nordisk A/S), a multi-active $\beta$-glucanase preparation produced by a selected strain of *Humicola insolens* in which the dominant activities are cellulase, xylanase, pentosanase and arabanase.

Maturation

The maturation is carried out in order to develop the flavor by holding at 80–140° C., usually for 10 minutes–12 hours. The shortest times correspond to the highest temperature and vice versa. Thus, the maturation can be done at 80–100° C. for 2–12 hours, at 100–120° C. for 30 minutes–4 hours, or at 120–140° C. for 10 minutes–2 hours. For optimum flavor development, the pH during maturation is preferably in the range 4–7 (particularly 4.5–6). Thus, if needed, the pH may be adjusted prior to the maturation.

Optional Process Steps

Optionally, the slurry after the enzyme treatment may be concentrated before the maturation, e.g. by evaporation (optionally under vacuum) to achieve a concentration of dry matter of 20–40%.

Also optionally, solids may be separated from the slurry after the maturation. Such separation, if desired, can be done by conventional means such as filtration, ultra-filtration or centrifugation.

Use of Food Flavoring Agent

The flavoring agent of the invention may be used in the same manner as conventional Hydrolyzed Vegetable Protein (HVP) for imparting flavor to a wide range of food products such as soup and sauces.

EXAMPLES

Example 1

Flavor of High DH Protein Hydrolysate Maturated With and Without the Presence of Sediment Protein Hydrolysis Process Description.

An enzyme hydrolysate was made in Pilot Plant scale with a high degree of hydrolysis (DH) according to the following procedure.

33 kg of defatted untoasted soy grits were mixed thoroughly with 200 l of tap water and heated for 5 min at 85° C. The mixture was cooled to room temperature and pH adjusted to 7.

5 g of Flavourzyme (850 LAPU/g)/100 g protein and 1 g of Alcalase (2.4 AU/g)/100 g protein was added to the reaction mixture. Hydrolysis proceeded for 5 hours at 50° C., after which 1% of NaCl was added and pH adjusted to 5 with 4N HCl. Additional 2.5 g of Flavourzyme (850

LAPU/g)/100 g of protein were added and hydrolysis continued for 20 hours at 50° C. Enzymes were inactivated for 5 min at 85° C.

The resulting hydrolysate contained 13% of dry matter of which approximately 55% was soluble. The protein content was 8% of which 85% was soluble and the carbohydrate content was approximately 2.5%. The carbohydrate pool was found to have both soluble mono- and oligo saccharides (stachyose and raffinose) and insoluble cell wall material (mainly pectic substances with a high content of arabinogalactan). The Degree of Hydrolysis (DH) of the protein was 60%.

Maturation (heat-treatment) With and Without Sediment:

In order to develop the flavor of the protein hydrolysate a heat treatment was applied to favor Maillard reactions. At pH values below 4.5 and above 8 repulsive off-flavors were produced. Therefore flavor development in the hydrolysate in the pH interval from 5–7 was studied. In order to investigate the effect on flavor of the insoluble remains of the substrate, the hydrolysate was heated for 1 hour at 125° C. before and after a centrifugation step, i.e. with and without sediment, respectively. The flavor characteristics of the hydrolysates were judged as follows:

| pH | Sediment | Flavor notes |
| --- | --- | --- |
| 5 | − | bitter, slightly burned, slightly beany |
| 5 | + | slightly bitter, not burned, not beany |
| 6 | − | very bitter, burned, beany |
| 6 | + | bitter, not burned, not beany |
| 7 | 1 | extremely bitter, very burned, very beany |
| 7 | + | bitter, slightly burned, not beany |

It is evident from the above that hydrolysates which have received heat treatment in presence of sediment are less bitter, burned and beany in flavor characteristics. Thus, heating with the insoluble plant parts improves the overall flavor profile of the products.

Example 2

Enzymatically Hydrolyzed Soy Protein

The process consisted of 4 steps, i.e. pre-treatment, hydrolysis, maturation and post-treament (separation, concentrating and spray drying).

Pre-treatment 50 kg of soy flake was mixed with 200–300 kg of water and pre-cooked directly. The pre-cooking was carried out at 95° C. for 60 minutes. The final weight was adjusted to 250–350 kg, and the mixture was cooled.

Hydrolysis

The hydrolysis was carried out at 55° C. and natural pH. 0.125 kg of Alcalase 2.4 L and 0.375 kg of Flavourzyme 1,000 L were added at the start.

The hydrolysis was carried out for 3–4 hours. After 3–4 hours the pH was reduced to 5.0–5.5, and 0.375 kg of Flavourzyme 1000 L and 0.100 kg of Viscozyme were added. The hydrolysis was continued over night, totally 16–20 hours.

Maturation

The hydrolysis was followed by cooking for 4 hours at 95° C. with sediment present.

Post-treatment

The hydrolysate was separated either in Ultra Filtration at 60° C., or by simple filtration dual plate and frame filter. Celite was used as filter aid. The permeate was Nano filtered at 60° C. until a concentration of 30–35 Brix.

The concentrate was matured at 90° C. for 4 hours for further flavor enhancement before the eventual formulation to a final composition. Spray drying was carried out using an inlet temperature of approx. 180° C. and an outlet temperature of approx. 80° C.

The taste of the treated hydrolysate had no beany flavor.

Example 3

Flavor of Heat Treated Protein Hydrolysates With and Without Carbohydrase

Hydrolysis Process Description

An enzyme hydrolyzate was made in Pilot Plant scale with high DH according to the following procedure.

33 kg of defatted untoasted soy grits were mixed thoroughly with 200 l of tap water and heated for 5 min at 85° C. The mixture was cooled to room temperature and pH adjusted to 7.

5 g of Flavourzyme (850 LAPU/g)/100 g protein and 1 g of Alcalase (2.4 AU/g)/100 g protein was added to the reaction mixture. Hydrolysis proceeded for 5 h at 50° C., after which 1% of NaCl was added and pH adjusted to 5 with 4N HCl. Additional 2.5 g of Flavourzyme (850 LAPU/g)/100 g of protein were added and hydrolysis continued for 20 hours at 50° C. Enzymes were inactivated for 5 min at 85° C.

The resulting hydrolysate contained 13% of dry matter of which approximately 55% was soluble. The protein content was 8% of which 85% was soluble and the carbohydrate content was approximately 2–5%. The carbohydrate pool have both soluble mono- and oligo saccharides (stachyose and raffinose) and insoluble cell wall material (mainly pectic substances with a high content of arabinogalactan). The Degree of Hydrolysis (DH) of the protein was 60%.

Degradation of Polymeric Sugars

The soy protein hydrolyzate described above was treated with the following carbohydrase preparations (alone and in combination) to hydrolyze insoluble cell wall polysaccharides: Viscozyme® (Novo Nordisk), a multi-carbohydrate product, and (beta)-1,4-galactanase, arabinanase and α(alpha)-arabinofurano-sidase from *Aspergillus aculeatus*.

2 litres of hydrolyzate was adjusted to 40° C. in a water bath and the pH adjusted to 5. Enzyme was added and reaction took place for 4 h. Enzymes were inactivated by heating for 5 min. at 85° C. Dosages of the enzymes were: Viscozyme 1% of dry matter (2.6 g to 260 g of DM), galactanase 0.006% of DM, α-arabinofuranosidase 0.006% of DM, and arabinanse 0.006% of DM.

Maturation (heat treatment) for Flavor Development

The flavor in the carbohydrase treated hydrolysates was developed in a heat treatment step allowing for Maillard reactions to occur.

The flavor characteristics developed after 1 hour at 125° C. at pH 5 were judged by a panel test as follows. A blank sample not subjected to carbohydrase treatment was included in the experiment.

| Sample No. | Enzyme(s) | Flavor Note |
| --- | --- | --- |
| 1 | Blank | meat and vegetables |
| 2 | Viscozyme | roasted meat, smoked, vegetables |
| 3 | Galactanase | roasted meat, smoked |
| 4 | α(alpha)-arabinofuranosidase | smoked pork |

-continued

| Sample No. | Enzyme(s) | Flavor Note |
| --- | --- | --- |
| 5 | Galactanase + α(alpha)-arabinofuranosidase | roasted meat, smoked (more intense than 3 and 4) |
| 6 | Arabinanase + α(alpha)-arabinofuranosidase | smoked pork (more sweet than 4) |

It is evident from the above that there is an obvious difference in flavor due to carbohydrase treatment. Hydrolysates which have received heat treatment after carbohydrase degradation are different from the blank and the different carbohydrases give different flavor notes. Liberated galactose and/or galactooligomers induce a roasted character to the hydrolyzate, whereas liberated arabinose induces a smoked and pork like note. The multi-enzyme complex which liberates xylose, rhamnose, fucose and glucose in addition to arabinose and galactose, further adds a vegetable flavor note.

Example 4

Reduced Bitterness by Heat Treatment With Sediment from Wheat Gluten or Soy Meal Wheat gluten (Cargill Job 5141), or a mix of wheat gluten and soy bean meal (Cargill granulated 20/80/20), was hydrolysed with proteases. The protein content during hydrolysis was 10% (in the mix of soy and wheat gluten 50% of the protein was from wheat gluten and 50% from soy bean meal).

Calculated on basis of substrate protein, enzymes were added at a dosage of 2% Flavourzyme™ 1000L and 1.0% Protamex™ 1.5 MG (Flavourzyme™ and Protamex™ are available from Novo Nordisk A/S, Denmark). Before addition of enzymes, pH was adjusted to 6.5, but pH was not adjusted during hydrolysis. Hydrolysis took place for 18 hours at 50° C., where after pH was adjusted to 5.

The half part of the hydrolysates were centrifuged to recover the soluble protein and the soluble phase was heated for 1 hour at 125° C. The other half part of the hydrolysates were heat treated at 125° C. for 1 hour before centrifugation took place and the soluble protein was recovered. DH was measured in the hydrolysates to be approximately 32% in pure wheat gluten hydrolysates and approximately 35% in hydrolysates of mixed gluten and soy protein.

The supernatants were diluted 8 times and presented to a trained panel for sensory evaluation. 12 assessors were asked to score the bitterness of each hydrolysate on a point scale from 0 to 9. Each hydrolysate was presented twice and the hydrolysates were served to the different assessors in randomised order. The collected data were subjected to statistical treatment by two-way ANOVA with assessors and hydrolysates as independent variables and the bitterness score as dependent variable. The mean value for each hydrolysate and the least significant difference (Fishers LSD) at a 95% confidence level between two differently treated hydrolysates was calculated.

The results are presented in Table 1, below.

TABLE 1

| | Mean bitterness score for the different hydrolysates | |
| --- | --- | --- |
| hydrolysate | 1.48 heated with sediment | 2.40 heated without sediment |
| wheat gluten | 3.19 | 3.88 |
| wheat gluten + soy | 1.48 | 2.40 |

The LSD value was 0.50.

From the table it clearly appears that the bitterness is decreased when the sediment (insoluble plant material) is present during heat treatment. This phenomenon seems to be general for insoluble plant materials since it has now been observed for soy protein as well as wheat gluten protein and for mixtures hereof.

We claim:

1. A process for producing a food flavoring, said process comprising:
   (a) preparing an aqueous slurry comprising 1–40% by weight of plant protein and plant material,
   (b) treating the slurry with:
      (i) one or more proteases to hydrolyze the protein to a degree of hydrolysis above 25%, and
      (ii) a carbohydrase selected from the group consisting of arabinanase, xylanase, galactanase, arabinanase, α-arabinofuranosidase, and combinations of any of the foregoing; and
   (c) exposing said treated slurry to a temperature between 80° C. and 140° C.

2. A process as defined in claim 1, wherein the plant protein and the plant carbohydrate are derived from seeds of a legume.

3. A process as defined in claim 2, wherein the legume is soy bean.

4. A process as defined in claim 1, wherein the protease is a microbial protease derived from a strain of Bacillus or Aspergillus.

5. A process as defined in claim 4, wherein said Bacillus strain is *B. licheniformis* and said Aspergillus strain is *A. oryzae*.

6. A process as defined in claim 1, wherein the carbohydrase is derived from a strain of Aspergillus.

7. A process as defined in claim 6, wherein said Aspergillus strain is *A. aculeatus*.

8. A process as defined in claim 1, wherein the exposing step is carried out at a pH between 4 and 7.

9. A process as defined in claim 8, wherein said pH is between 4.5 and 6.

10. A process as defined in claim 1, wherein the exposing step comprises a treatment selected from the group consisting of: (i) 80–100° C. for 2–12 hours; (ii) 100–120° C. for 1–4 hours; and (iii) 120–140° C. for 0.25–2 hours.

11. A process as defined in claim 1, further comprising, following step (b), (c) removing insoluble material.

12. A process as defined in claim 11, wherein said removing is carried out by ultra-filtration, filtration, and/or spray drying.

13. A process for producing a food flavoring agent, said process comprising:
   (a) preparing an aqueous slurry comprising 1–40% by weight of plant protein and insoluble plant material;
   (b) treating the slurry with one or more proteases to hydrolyze the protein to a degree of hydrolysis above 25%;

(c) heating the treated slurry at: (i) 80–100° C. for 2–12 hours; (ii) 100–120° C. for 1–4 hours; or (iii) 120–140° C. for 0.25–2 hours, wherein no separation of insoluble material is performed between step (a) and step (c).

14. A process as defined in claim 13, wherein the insoluble plant material is insoluble plant cell wall material.

15. A process as defined in claim 13, wherein the plant protein is wheat gluten.

16. A process as defined in claim 13, wherein the plant protein and the insoluble plant material are derived from seeds of a legume.

17. A process as defined in claim 13, further comprising, prior to step (b), heating the slurry at 80–125° C. for 20 minutes–2 hours.

18. A process as defined in claim 13, wherein step (b) comprises treating the slurry with a bacterial and a fungal protease.

19. A process as defined in claim 18, wherein step (b) comprises treating the slurry with a Bacillus protease and an Aspergillus protease.

20. A process as defined in claim 13, further comprising treating the slurry with a non-proteolytic enzyme.

21. A process as defined in claim 20, wherein the non-proteolytic enzyme is a carbohydrase.

22. A process as defined in claim 21, wherein the carbohydrase is selected from the group consisting of cellulase, β(beta)-glucanase, and hemi-cellulase.

23. A process as defined in claim 21, wherein the carbohydrase is selected from the group consisting of arabinanase, xylanase, galactanase and α(alpha)-arabinofuranosidase.

24. A process as defined in claim 21, wherein the carbohydrase is selected from the group consisting of arabinanase, xylanase, galactanase, α(alpha)-arabinofuranosidase, β(beta)-amylase, 1,3- or 1,4-β(beta)-xylosidase, β(beta)-1,4-galactanase, α(alpha)-galactosidase, β(beta)-galactosidase, mannanase, cellobiohydrolase, hemi-cellulase, rhamnogalacturonase, rhamnopyranohydrolase, polygalacturonase, glucuronisidase, β(beta)-glucanase, β-glucosidase, and combinations of any of the foregoing.

25. A process as defined in claim 21, wherein the carbohydrase is selected from the group consisting of α(alpha)-amylase, β(beta)-amylase, glucoamylase, hemi-cellulases, cellulases, and pectinases.

26. A process as defined in claim 21, wherein the carbodydrase is selected from the group consisting of α(alpha)-amylase, β(beta)-amylase, glucoamylase, hemi-cellulases, arabinanase, arabinofuranosidase, xylanase, 1,3-β(beta)-xylosidase, 1,4-β(beta)-xylosidase, β(beta)-1,4-galactanase, α(alpha)-galacto-sidase, β(beta)-galactosidase, mannanase, cellulases, cellobiohydrolase, endo-glucanase, pectinases, rhamnogalacturonase, rhamnopyranohydrolase, polygalacturonase, glucuronisidase, β(beta)-glucanase, and β-glucosidase.

27. A process as defined in claim 13, step (c) is conducted at pH 4–7.

28. A process as defined in claim 13, further comprising, after step ( c), separating the solids using a method selected from the group consisting of by ultra-filtration, filtration, spray drying, and combinations of the foregoing.

* * * * *